United States Patent [19]

Hrivnak et al.

[11] 4,388,356
[45] Jun. 14, 1983

[54] HEAT SETTING A THERMOFORMED PET ARTICLE UTILIZING A MALE PLUG AS A CONSTRAINT

[75] Inventors: John E. Hrivnak, Clinton; Robert J. Gartland, Youngstown, both of Ohio

[73] Assignee: The Goodyear Tire & Rubber Company, Akron, Ohio

[21] Appl. No.: 322,106

[22] Filed: Nov. 16, 1981

[51] Int. Cl.³ .............................................. B29C 17/04
[52] U.S. Cl. .................................... 428/35; 264/547; 264/549; 264/554; 264/544
[58] Field of Search ............... 264/547, 549, 544, 554; 428/35

[56] References Cited

U.S. PATENT DOCUMENTS

| | | | |
|---|---|---|---|
| 3,400,111 | 9/1968 | Schwartz | 264/547 |
| 3,496,143 | 2/1970 | Siggel et al. | 264/547 |
| 3,499,188 | 3/1970 | Johnson . | |
| 3,737,494 | 6/1973 | Wolf | 264/549 |
| 3,739,052 | 6/1973 | Ayres et al. . | |
| 3,814,784 | 6/1974 | Wolf | 264/549 |

FOREIGN PATENT DOCUMENTS

| | | |
|---|---|---|
| 872272 | 11/1978 | Belgium . |
| 8004049 | 1/1981 | Netherlands . |
| 1367338 | 9/1974 | United Kingdom . |
| 1374969 | 11/1974 | United Kingdom . |
| 1374970 | 11/1974 | United Kingdom . |
| 1508574 | 4/1978 | United Kingdom . |

OTHER PUBLICATIONS

Beijen, "Solid-Phase Pressure Forming Process for Thin-Walled Polypropylene Containers", *Plastics & Rubber Processing*, Jun. 1979, pp. 66-70.
Polypropylene and Solid Phase Forming, Shell Chemical Company, Mar. 1981.

*Primary Examiner*—William R. Dixon, Jr.
*Attorney, Agent, or Firm*—Daniel J. Hudak; Bruce Hendricks

[57] ABSTRACT

A process and apparatus for manufacturing a polyester container having good clarity and dimensional stability and which can be used in hot-fill food package manufacture and/or in making a container for reheating or heating the contents within. In particular, this process and apparatus is a deep stretch-forming technique for preparing biaxially oriented, heat set, sealable containers of high molecular weight polyethylene terephthalate. The process comprises deep drawing a preheated sheet of the polyester into a heated female cavity by means of a male plug. The part is heat set against the female cavity, and cooled against the male plug which is used as a constraint. The part is subsequently removed from the male plug.

20 Claims, 9 Drawing Figures

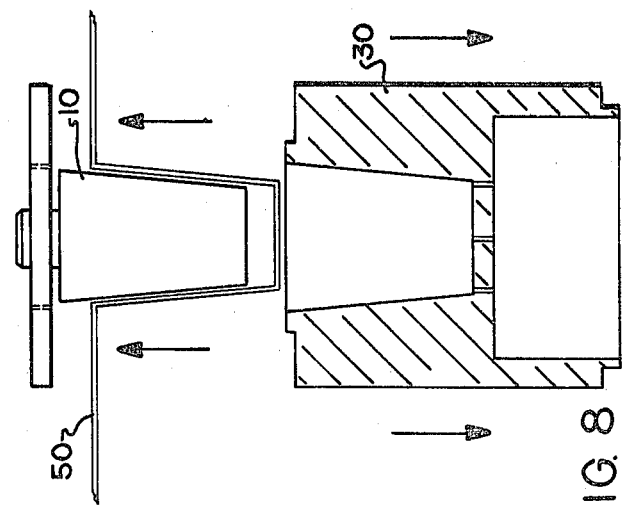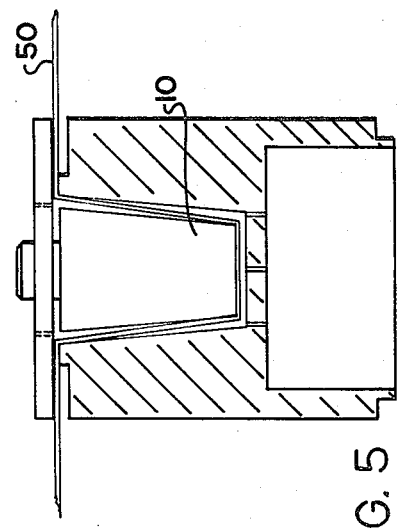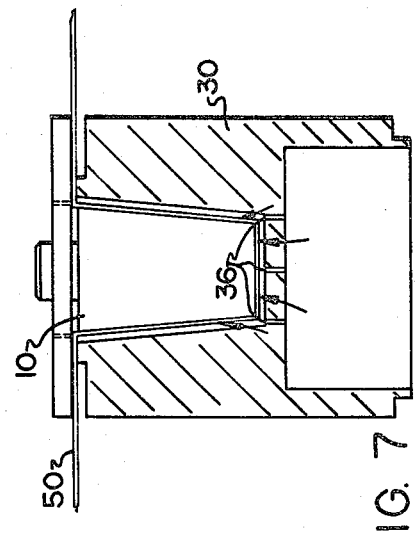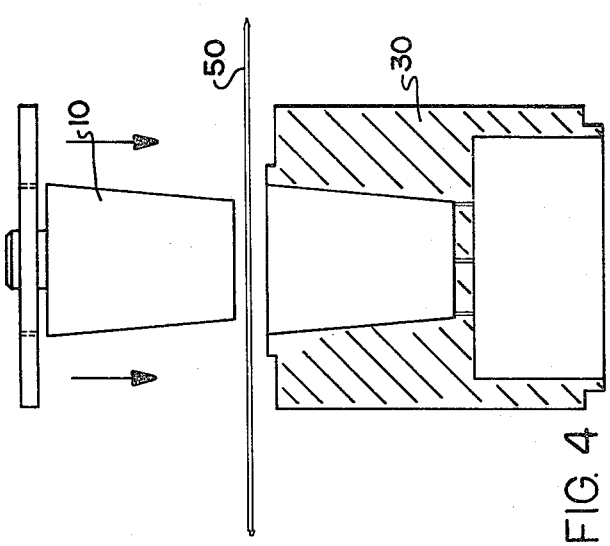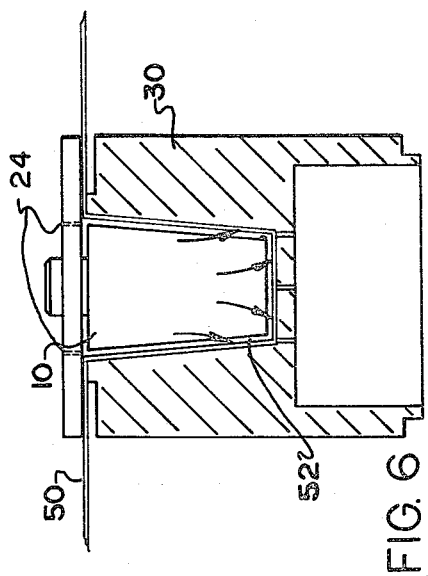

HEAT SETTING A THERMOFORMED PET ARTICLE UTILIZING A MALE PLUG AS A CONSTRAINT

TECHNICAL FIELD

This invention relates to a process for forming polyethylene terephthalate (PET) containers. In particular, the invention describes a deep-stretch forming process for making a biaxially oriented, heat set container from high molecular weight PET sheet while manufacturing clarity and impact resistance.

BACKGROUND ART

Heretofore, a great deal of attention and effort has been directed to the development of polymeric containers for the storage of food stuffs and the like. Polyesters are currently being used for the packaging of food and beverages. Applications include polyester-coated paper board for ovenable trays, soft drink carbonated beverage bottles, mouthwash containers, thermoformed blister packs for the packaging of cold cuts, and films in various food wrap applications.

While there are plastics available which may be successfully utilized in hot-fill applications, these materials have one or more of several disadvantages, such as lack of acceptable strength, or the requirement of special processing techniques which considerably raise the manufacturing costs of the container, or the materials are too expensive to be cost-competitive.

As is well known, the major drawbacks in using polyester in hot-fill food applications are basically two-fold. First, if biaxially oriented, the polyester containers undergo considerable shrinkage when heated to temperatures at or near their glass transition temperature. Secondly, unoriented polyester containers will undergo a change in crystallinity at elevated temperatures such as those encountered in hot-fill food applications resulting in their becoming opaque and brittle.

Oriented polyester polymers, when heated above their glass transition temperature, tend to shrink back to an unoriented state. This shrinkage is caused by frozen-in stresses as a result of molecular chain extension during stretching. Therefore, in shrinking, the polyester exerts a retractive force. By heat setting a stretched polyester polymer under a constraint, oriented crystallites are formed. Total crystallinity increases without significantly affecting brittleness or clarity. This crystallinity persists up to near the heat setting or formation temperature. Shrinkage will therefore be curtailed or otherwise largely retarded during in-service use at elevated temperatures, such as in hot-fill applications.

This invention relates to a process for making polyester articles which includes heating an amorphous sheet of unoriented PET, drawing the PET sheet with a male plug, which causes biaxial orientation, transferring the drawn sheet from the male plug to a female mold which heat sets and molds the PET, then allowing the PET to shrink back onto the male plug which thereby cools the PET to below its glass transition temperature while being constrained by the male plug. A clear and non-brittle article is thus obtained.

By way of prior art are several United States and foreign patents, and several articles. U.S. Pat. No. 3,499,188 deals with an apparatus for forming articles of cold-strengthenable materials. There is no teaching in this patent concerning heat annealing polyethylene terephthalate.

U.S. Pat. No. 3,739,052 teaches a process for forming a thermoplastic container in which the cycle time has been reduced over the prior art. No mention is made of heat annealing the thermoplastic resin, thus this patent is not pertinent.

Belgian Pat. No. 872,272 deals with improvements and vessels for carbonated beverages. Again, no mention is made of heat annealing for hot-fill applications.

Dutch Pat. No. 8004-049 deals with deep drawn, thin-walled plastic containers formed by process of drawing a preheated sheet with a punch and shaping the blank in a die using air pressure. The invention utilizes a cold female mold cavity, and thus teaches away from the process in the instant invention.

British Pat. Nos. 1,374,969 and 1,374,970 concern a sealed, thin-walled container and process for making same. No mention is made of the use of polyesters or of forming biaxially oriented heat-annealed containers.

British Pat. No. 1,367,338 deals with a method for making cupped articles from a polyolefin plastic sheet. Again, no mention is made for biaxial orientation or heat annealing of polyester. Thus, this patent also is not pertinent.

British Pat. No. 1,508,574 concerns improvements relating to containers thermoformed in plastic materials. More specifically, the patent teaches a process for forming containers having nestable qualities and which resists storage creep. No mention is made of hot-fill capability, or heat setting.

Several articles by Shell Research deal with solid phase-pressure forming and solid phase-stretch forming for polypropylene. In particular, the article entitled "Polyproylene Solid Phase Pressure Forming a New Process for the Packaging Industry" by M. Ball, S. J. Dagniaux and K. G. Moxom, published in the SOCIETY OF PLASTICS ENGINEERS, ANTEC, 1974, deals with the thermoforming of polypropylene. "Solid Phase Pressure Forming Process for Thin-Walled Polypropylene Containers," J. M. Beijen is also concerned with strictly forming polypropylene containers. This article was published in PLASTICS AND RUBBER PROCESSING, June 1979. Neither of these articles deal with the biaxial orientation and heat annealing of polyester. An Industrial Information brochure published by Shell entitled "Polypropylene and Solid Phase Forming," explains in detail both the solid phase pressure forming and solid phase stretch forming. This article, like the two mentioned above, does not deal with the use of polyesters.

An article entitled "The Use of Polypropylene for a Thin-Walled Container Manufacturer," by S. J. Dagniaux and K. G. Moxom deals specifically with solid phase pressure forming and, as above, does not deal with polyesters.

DISCLOSURE OF INVENTION

In light of the foregoing, it is an object of this invention to provide a deep stretch-forming process for producing a polyester container having good clarity and dimensional stability for use in hot-filled capability and/or use.

Another object of this invention is to provide a process to make a biaxially oriented, impact resistant, sealable container from PET.

Still another object of the invention is to provide a process for producing a PET container, as above, in which the cycle time is reduced.

Another object of the invention is to produce a process for making the polyester container using a relatively cold male plug and a hot female mold cavity.

Yet another object of the instant invention is to provide a process in which a polyester sheet is deep drawn, using a relatively cold male plug, and transferred across a gap to a hot female mold cavity using a fluid pressure.

These and other objects of the present invention which will become more clear as a detailed description proceeds are achieved by a heat set polyester article, comprising: the article made by heating an amorphous sheet of polyethylene terephthalate to a temperature high enough to cause softening thereof; heating a female mold to a temperature above the glass transition temperature to crystalline PET; positioning said softened sheet over the cavity of said female mold; drawing said softened sheet in said female mold cavity using a male plug; transferring said softened sheet from said male plug to said female mold cavity by the application of air pressure to said softened sheet; heating said softened polyester sheet to above its glass transition temperature through contact with the surface of said female mold which causes said polyester to be heat set thereby; releasing said air pressure thereby allowing said molded polyester to shrink back onto said male plug and be cooled thereby; and withdrawing said molded, cooled polyester from said plug.

In general, a process for heat setting polyethylene terephthalate, comprising the steps of: heating an amorphous sheet of polyethylene terephthalate to a temperature above its glass transition temperature; heating a female mold to above the glass transition temperature of said polyethylene terephthalate to effect crystallization; positioning said sheet over said female mold cavity; drawing said sheet into said cavity by means of a male plug maintained at a temperature below the oriented, crystallized glass transition temperature of said sheet; transferring said stretched polyethylene terephthalate sheet from the surface of said male plug to the surface of said female mold across a gap therebetween; allowing said molded polyethylene terephthalate to shrink back onto said male plug and thereby be cooled to a temperature below its glass transition temperature.

BRIEF DESCRIPTION OF DRAWINGS

For a fuller understanding of the objects, techniques, and structure of the invention, reference should be made to the ensuing detailed description and accompanying drawings, wherein:

FIGS. 4 through 8 illustrate various stages of the process of the instant invention;

BEST MODE FOR CARRYING OUT THE INVENTION

This invention provides a process whereby a hollow polyester container having good clarity and dimensional stability can be prepared for use in hot-filled packaging processes and/or as a container for heating or reheating materials stored therein, either by a conventional oven or a microwave oven. A polyester is heat set or annealed by heating amorphous PET to above its glass transition temperature (Tg) of 67° C. (153° F.), at which temperature the polymer begins to crystallize. Further heating at higher temperatures increases the rate of crystallization or heat set until a maximum rate is reaches at about between 170° C. to 180° C. (340° F. to 360° F.).

Prior to this invention, the heat annealing of PET was in general uneconomical. This was due to the high energy cost associated with the heating and cooling of the mold. Cyclic heating and cooling was heretofore necessary because the molded article could not be removed from the mold until it had been cooled to below its glass transition temperature. The instant invention obviates the need for cyclic heating and cooling, while at the same time produces a biaxially oriented, heat-annealed article.

Figure 1:
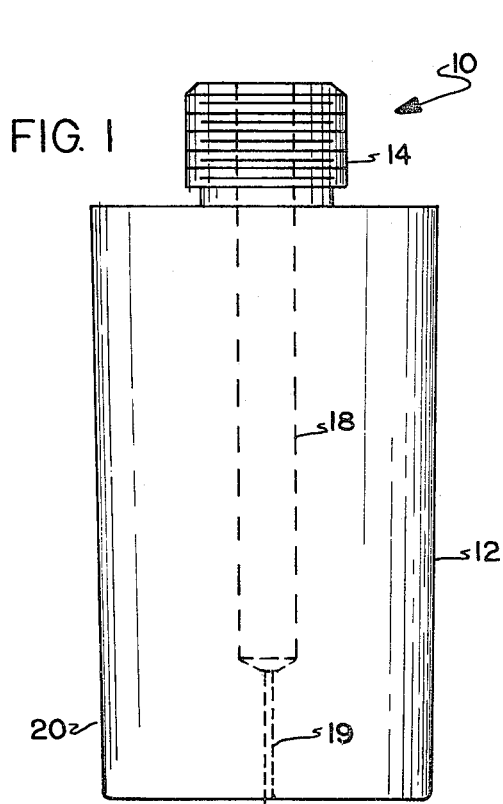
FIG. 1 is a side elevational view of the male plug of the instant invention.
Figure 9:
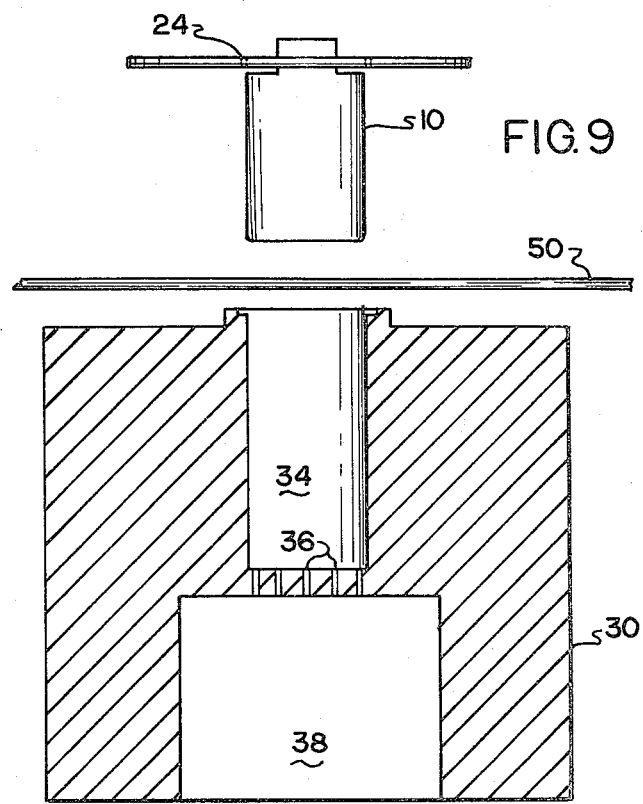
FIG. 9 is a side elevational view of the male plug and female mold of the instant invention.

The invention can best be described with reference to FIGS. 1, 2 and 3 which illustrate a mold for a container such as a cup. FIG. 1 shows a male plug generally designated by the number 10. A plug body 12 is cylindrical in shape and may be tapered, having a draft 20 of about between ½ degree and 4 degrees. Appended to the top of plug 10 is male thread 14 through which is bored an insert 18 extending into plug body 12 and serving as a means for receiving a cartridge heater (not shown). A vent hole 19 provides communication between the bottom of plug 10 and insert 8. This facilitates releasement of a molded part from male plug 10 which otherwise would become vacuum locked onto said plug.

Figure 3:
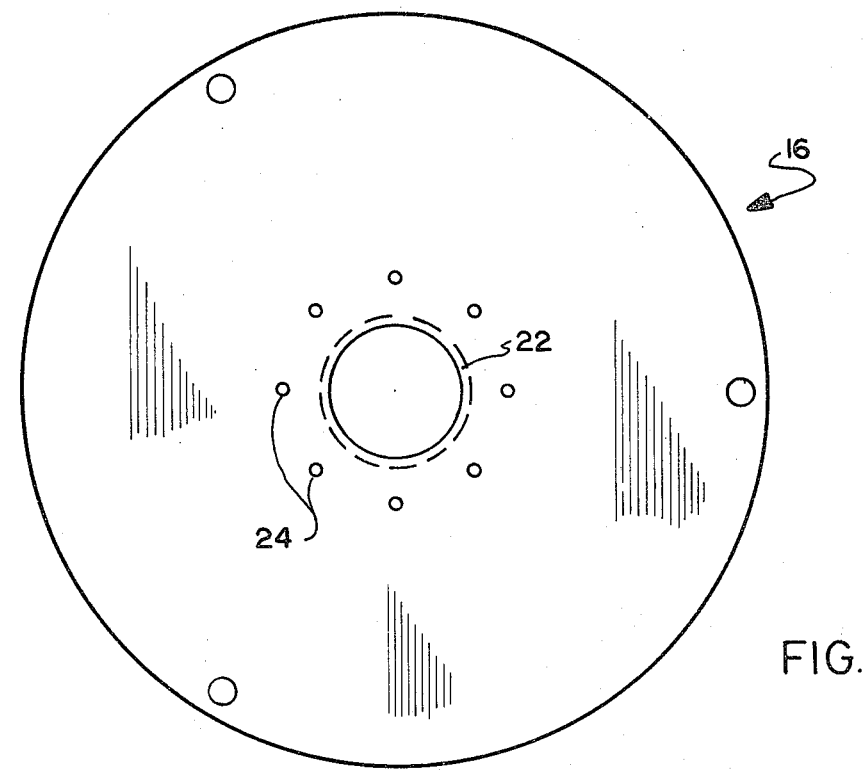
FIG. 3 is a side cross-sectional view of the male plug plate.

Male plug plate 16, shown in FIG. 3, is threadably secured to male plug 10 through female thread 22. Air inlet holes 24 are disposed in circular manner and passed completely through the plate. The position of said inlet holes is such that the circular pattern described has a diameter approximately the same as the diameter of male plug 10. A preferred design is where the holes 24 describe a circular pattern just slightly larger than said male plug diameter such that the inner circumferential edges of holes 24 are flush with the plug diameter or are even partially blocked by the plug diameter.

Figure 2:
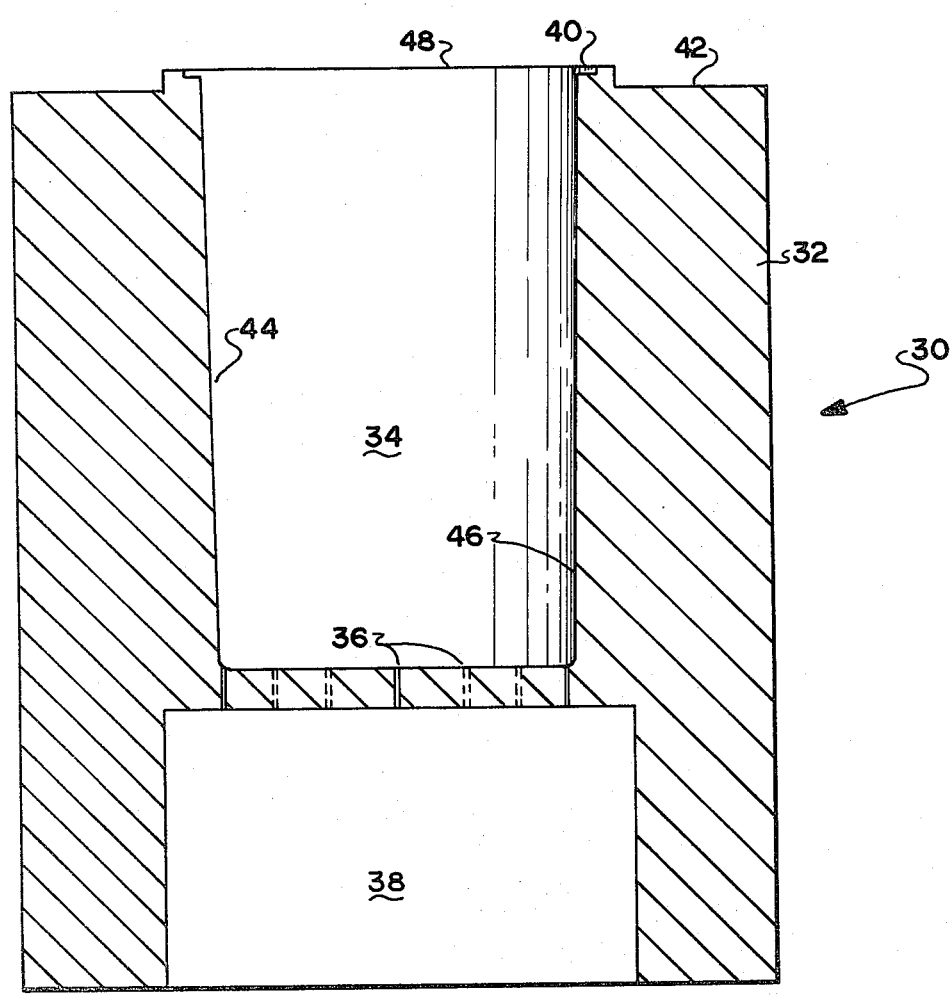
FIG. 2 is a side elevational view of the female mold.

In FIG. 2, a female mold is generally indicated by the number 30. A mold body 32 contains therein a mold cavity 34 having a plurality of evacuation holes 36. Said evacuation holes in turn communicate with the evacuation cavity 38. Mold cavity 34 is of cylindrical shape and preferably of slightly larger diameter than male plug body 12. Further, said mold cavity 34 may contain a draft 44 of a size similar to that of male plug 12. The female mold cavity can have a recessed bottom of any shape or design, not shown. Thus, an article such as a hot-fill container can be produced having a lid, edge, or the like.

Mold cavity 34 may in addition have a break corner 40 at its upper circumferential edge. This allows airtight sealment of the mold during the molding cycle by squeezing the amorphous PET sheet (not shown) between said break corner 40 and said male plug plate 16 on male plug 12, the latter mating to said break corner 40. Recess 42 limits mold sealment to the area 48 immediately surrounding said break corner.

It will be noted that the invention is not limited to cylindrical containers, but applies to containers of other geometrical shapes and is limited only by the skill of the moldmaker.

FIGS. 4 through 8 illustrate schematically the process of forming and heat-setting polyester. A preheated, softened sheet of polyester 50 is positioned above a female mold 30. Preheated male plug 10 then draws the polyester 50 into the female mold 30 and transfers the polyester 50 across a gap 52 to said female mold by means of air pressure applied through air inlet holes 24.

After molding and heat setting are completed, the air pressure is removed and the polyester 50 is allowed to shrink back onto the male plug 10. If the article is to contain the reversed bottom, air pressure must be applied to the underside of the female mold 30 through the vent holes 36. This is necessary because the absence of or lack of positive air pressure beneath the female mold 30 permits the PET to bridge across the recess in the male plug 10.

Once the molded polyester article has shrunk back onto the male plug, the female cavity is subsequently removed. A blast of air may optionally be used to assist in stripping the molded polyester article off the male plug or, alternatively, a mechanical stripper may be used. A polished male plug is preferred since the container can be easily slipped off.

As will be described more fully hereinbelow, the male plug, although preheated, is heated to a much lower temperature than is the female mold. The temperature of the male plug is important not only from the standpoint of conserving energy, but also to allow constrained cooling of the molded article. After it is heat-set in the female cavity, the biaxially oriented PET article is allowed to cool against the male plug acting as a constraint. This technique maintains the article's biaxial orientation and optical clarity. The invention is also illustrated by the detailed description set forth below. With reference to Example I, it can be seen that use of a relatively cool male plug not only conserves energy, but simultaneously reduces the mold cycle time because the molded PET article cools rapidly after it has shrunk onto the male plug. The article or container can thus be quickly removed from the mold. Neither the female mold 30 nor the male plug 10 need be heated before the next mold cycle begins.

The actual heat setting or heat annealing occurs while the polyethylene terephthalate polymer is in contact with the hot female mold 30. Heat, of course, is tranferred from the female mold to the polymer. At this point, when the air pressure is released, the oriented PET will shrink due to retractive stresses as described in the background of this invention onto the cooler male plug. Once cooled against the male constraint, the polymer will remain dimensionally stable unless heated to a temperature above the highest temperature reached during crystallization.

As used throughout this specification and the appended claims, the term "glass transition temperature" means that temperature or temperature range at which a change in slop appears in the volume versus temperature curve for said polymer and defining a temperature region below which the polymer exhibits a glassy characteristic and above which the polymer exhibits a rubbery characteristic. The term "crystallization temperature" means that temperature or temperature range in which a regularly repeating morphology, brought about by a combination of molecular mobility and secondary bonding forces, is induced in a polymer over a molecular distance of at least several hundred angstroms. The amount of crystallinity in the PET article as molded is generally between 25 and 35% and averages about 30%.

The glass transition temperature (Tg) of polyester in various states has been reported as follows:

| | |
|---|---|
| Amorphous | 67° C. |
| Crystalline | 81° C. |
| Oriented and Crystalline | 125° C. |

The process of heat-setting an oriented article increased its Tg significantly. Therefore the cooling requirement is less due to the higher Tg in the article.

The amount of air pressure necessary to transfer the oriented PET from the male plug 10 to the female mold 30 during the molding operation has been found to vary, depending on the amount of draw or stretch applied to the amorphous PET sheet which varies depending on the length of male plug 10. As the amount of stretch increases, the polymer chains tend to increasingly orient themselves. The greater the degree of orientation, the greater the strength of polymer and thus the greater the air pressure needed to dislodge the PET sheet from male plug 10.

It has been found that for most cases, the air pressure needed does not exceed 21 Kg/cm$^2$ (300 psi), but must be at least 0.7 Kg/cm$^2$ (10 psi). Generally, the air pressure used is between about 3.5 Kg/cm$^2$ (50 psi) and about 5.6 Kg/cm$^2$ (80 psi) with about 4.6 Kg/cm$^2$ (65 psi) being the pressure most often utilized.

The efficiency of orientation in PET is a function of both the deformation rate (drawing speed) and temperature of the sheet. At a constant temperature, the degree of orientation increases as the rate of deformation increases (60 to 1200 inches per minute). In addition, at a constant deformation rate, the degree of orientation increases as the temperature decreases (e.g. 130° C. to 70° C.). As known to those skilled in the art, the efficiency of orientation is the proper combination of deformation rate and temperature of the polymer.

The type of orientation obtained during the draw is generally in the longitudinal axis for the top half of the container sidewall, however, some biaxial orientation is observed for the bottom half of the container sidewall. The base or bottom of the container is uniformly biaxially oriented.

The annealing or heat-setting temperature is preferably between about 135° C. (275° F.) and 190° C. (374° F.). This temperature, of course, is the temperature to which the female mold 30 is heated. The male plug 10 on the other hand must always be maintained below the glass transition temperature (Tg) of oriented, crystallized PET, that is, less than 125° C. (257° F.), and greater than the glass transition temperature of amorphous PET, that is, greater than about 67° C. Usually the male plug is maintained at a temperature between about 70° C. and 110° C. (158° F. and 230° F.), with about 90° C. (194° F.) to about 100° C. (212° F.) being preferred. This temperature is maintained by the cartridge heater (not shown) located in bore 18.

The amorphous, non-oriented PET sheet is preheated to about between 80° C. (176° F.) and 130° C. (266° F.) with about 90° C. (194° F.) to about 100° C. (212° F.) being preferred. Preheating of the PET sheet softens it to the point where it can be easily drawn by male plug 10 and thereby oriented. Said male plug 10 generally has dimensions of between about 90 to about 99.5 percent of the dimensions of the inner surface of the female mold 30 with about 98 percent being preferred. It has been observed that if the dimensions of the male plug are less than about 90 percent of the female mold inner surface dimensions, unsatisfactory results are obtained. These results are due to insufficient shrinkage in the flange area which will cause the excess material to form a creased, wrinkled, or raised ridge.

The difference in dimensions between the male plug 10 and the female mold 30, of course, results in the formation of the gap 52. It is the necessity for having the gap 52 which requires that the male plug be dimensioned as a percentage of the female mold, as above. The actual gap utilized depends on the overall dimensions of the mold, the thickness and shape of the finished PET article, and the amount of draw desired. It is only necessary that the gap be wide enough such that the polyester may be transferred from the male plug to the female mold to be heated. If the gap is too narrow, insufficient heating of the polyester will occur due to its proximity to, or contact with the male plug. It is contemplated that one skilled in the art may devise a gap width suitable to the particular molding operation and not depart from the scope of this invention.

GENERAL PROCEDURE

The following detailed description more clearly illustrates the method for carrying out the invention.

Polyethylene terephthalate polymer is conventionally prepared by the reaction of either terephthalic acid or its lower alkyl ester, dimethyl terephthalate, with ethylene glycol. The resultant glycol ester is then conventionally polymerized to a high molecular weight product, that is, the polyester so produced has an intrinsic viscosity ranging from about 0.5 to about 1.10 and preferably from about 0.70 to about 1.0 as measured in a 60/40 by volume mixed solvent of phenol/tetrachloroethane at 30° C.

A sheet made from PET is secured in a frame and preheated in an oven to a temperature ranging from about 80° C. to about 130° C. (176° F. to 266° F.). The sheet is heated approximately 10° C. (18° F.) hotter than the actual forming temperature. Thus, a period of time is provided for temperature equilibration, especially for thick samples. The sheet in this case is amorphous PET whose crystallinity is less than 10 percent at the time of forming. The heated film is positioned above the female mold cavity (described hereinabove), secured in such a manner as to permit controlled slip-in of material. That is, the polyester sheet is allowed to flow across the lip of the female mold cavity as the male plug draws the polyester sheet into said cavity. This increases the container weight, improves material distribution, and provides a limited amount of orientation in the container flange area.

Mold closure is initiated in a preferred manner such that the lip of the female mold cavity arrives at the film surface simultaneously with the bottom of the male plug. This helps to eliminate wrinkles in the container flange area. As the polyester sheet is forced or drawn into the female mold cavity by the male plug, it is stretched and oriented. The male plug is attached to the male plug plate (described hereinabove) which contains holes in order to introduce the pressurized air. The male plug itself may also optionally include a vent hole through its center. After repeated process cycles, the temperature of the male plug approaches the temperature of the amorphous polyester sheet at the time of forming.

As described hereinabove, the female mold cavity has a flange-forming annular ring or a break corner which allows air tight sealment of the mold. When the mold portions are completely closed, the flange on the article or container is formed under hydraulic or pneumatic pressure.

After complete mold closure, air pressure is introduced in the male half of the cavity. At the same time, a female cavity is vented from below or, optionally, a vacuum is applied. The air pressure forces the film to contact the female mold by transferring across the gap between the cavity and the male plug. Preferably, the inner surface of the female mold incorporates a matte finish in order to eliminate any entrapped air between the mold surface and the polyester film. The temperature of the female mold is such that crystallization is induced in the polyester film. The annealing or heat setting of the polyester is a function of time and temperature. The cycle time to produce a given amount of crystallization is inversely proportional to the temperature of the female mold upto about 190° C. The preferred method is to select time-temperature combination achieving heat set or partial crystallization at controllable cycle times. It is also desirable to maintain a low level of crystallization in the flange portion of the molded article.

Unoriented PET becomes brittle when highly crystallized. Since the flange area has minimum orientation, retardation of crystallinity, i.e. appropriate selection of heat setting time and temperature, produces a flange tough enough to withstand the action of lid sealing equipment.

After the annealing period has been completed, the pressurized air and vacuum, if any, are released, thus allowing the molded polyester to shrink back across the gap to the male plug. Shrinkage is the result of retractive forces of the heat set, oriented article at the temperature of annealing. Because the male plug is maintained at a temperature below the glass transition temperature of annealed, oriented PET, contact with the male plug causes the molded PET article to cool below its glass transition temperature. The male plug acts as a constraint to the article, preventing further shrinkage, and thus cooled.

In some instances, it may be necessary to use air pressure from beneath the female cavity to force the crystalline, oriented polyester to the recess in the male plug for constrained cooling. This is particularly true where the molded article has what is known as a reverse bottom incorporated in the design. In such situations, the PET does not shrink completely back onto the male plug but rather bridges across the recess in the bottom or side of the plug. However, air pressure applied beneath the female mold surface releases the molded article from the female mold so that the desired contact is made upon the male plug.

In any event, after the molded article has shrunk onto the male plug, the female mold is withdrawn and the article is removed from the male plug either by a mechanical stripping action or the use of air pressure to the male portion of the mold. Preferably, the surface of the male plug should be polished to facilitate container removal.

The article or container so produced exhibits good clarity, dimensional stability (heat set), is sealable, and has a high degree of impact strength (biaxial orientation) rendering it useful in hotfilled packaging applications and as a container for heating or reheating.

EXAMPLE I

A 275 milliliter container was produced, in accordance with the above description, as follows:

a polyethylene terephthalate sheet, prepared by extrusion techniques, having a thickness of 0.060 inches and an intrinsic viscosity of 0.87 was heated to a temperature of about 100° C. and permitted to equilibrate to about 90° C. in an ambient environment before forming. The female mold cavity was heated to a temperature of 140° C. and the male plug was heated to a temperature of 100° C. The heated film was forced into the cylindrical chamber of the heated female cavity with the male plug moving at a rate of 6.4 cm/sec (2.5 inches/sec).

After complete closure of the mold, air pressure of 4.2 Kg/cm$^2$ was applied to the male half of the cavity and 659 mm/Hg (26 in. Hg) vacuum was applied to the female cavity, effecting transfer of the polyester sheet from the male plug to the surface of the female mold. The polyester sheet was formed and heat set for 20 seconds. Upon completion of the heat setting step, air pressure to the male cavity was released as was the vacuum to the female mold. The part was then constrained as it cooled on the male plug for five seconds, after which time the female mold was withdrawn and slight air pressure applied to the male plug to assist in removing the article.

Measurements conducted on the cylindrical sidewall and bottom sections of the container demonstrated that the material distribution during the forming process was relatively uniform with the cylindrical sidewall and bottom sections measuring approximately the same thickness of 0.058 cm. (0.015 in.).

The container so produced may be filled with boiling water without undue volume shrinkage. Actual tests yielded a typical value of 2.0 percent or less shrinkage. In addition, the container possessed good clarity and remained clear after being subjected to the boiling water test.

EXAMPLE II

A 270 ml container, which incorporates a reverse bottom, was produced in accordance with the process of the invention as follows:

A polyethylene terephthalate sheet (prepared by extrusion techniques) having a thickness of 0.072 inches and an intrinsic viscosity of 0.86 was heated to a temperature of about 100° C. and permitted to equilibrate to about 90° C. in an ambient environment before forming. The female cavity was heated to a temperature of 140° C. and the male plug was heated to a temperature of 90° C. The heated film was forced into the cylindrical chamber of the heated female cavity by the heated male plug moving at a rate of 2.5 inches/sec (6.4 cm/sec). When the mold was completed closed, 4.2 Kg/cm$^2$ (60 psig) air pressure was applied to the male half of the cavity and 659 mm Hg (26 in of Hg) vacuum was applied to the female cavity for 20 seconds to effect crystallization of the formed container. Subsequently, air pressure to the male cavity was released and the vacuum to the female mold was broken. Air pressure was introduced in the female mold cavity for five seconds at 42 Kg/cm$^2$ (60 psig) for constrained cooling and maintaining the contour of the reverse bottom. The air pressure was then released and the female mold was withdrawn. Slight air pressure was used on the male plug to assist in removing the part as it was being withdrawn. Measurements conducted on the cylindrical sidewall and bottom sections of the container demonstrated that the material distribution, during the forming process, was relatively uniform with the cylindrical sidewall and bottom sections measuring approximately the same thickness of 0.48 mm (0.018 inches).

PHYSICAL PROPERTIES

The mechanical properties of the container produced in Example I was measured and compared to those of an amorphous film of approximately the same thickness as that of the cylindrical sidewall container. The amorphous film was produced by a flat die extrusion process using polyethylene terephthalate of approximately the same intrinsic viscosity as that used in preparation of the container. All the pertinent data is set forth in Table I, infra.

The meaning of the various abbreviations set forth in Table I are as follows:

| (GPa) | gigapascals |
| "MPa" | megapascals |
| "in-lbf" | inch-pounds of force |
| "Kg-cmf" | kilograms-centimeters of force |

Generally, during the formation of the container, the structure will be stretched from about 4 to about 6 times in the axial direction and from about 1.5 to about 3 times average in the hoop direction of the container. This degree of stretching provides the desired biaxial orientation for mechanical property enhancement.

TABLE I
Physical Properties of Film Samples

| | Amorphous Film | Heat Set Formed Containers | |
|---|---|---|---|
| | | Hoop | Axial |
| Tensile strength[a], psi (MPa) | 8,000 (56) | 12,000 (84) | 25,000 (175) |
| Elongation at Break[a], percent | 450 | 300 | 60 |
| Tensile Modulus[a], psi (GPa) | 140,000 (0.98) | 230,000 (1.6) | 440,000 (3.1) |
| Gardner Impact Strength[b], in-lbs. (Kg-cmf) | 40 (48) | 100 (120) | |

[a]Determined in accordance with ASTM D-638-68
[b]Determined using Gardner falling dart apparatus and adapted from British Standard 2782-306 B.

While certain representative embodiments and details have been shown for the purpose of illustrating the invention, it will be apparent to those skilled in the art that various changes and modifications may be made therein, without departing from the spirit or scope of the invention. Thus, for a complete understanding of the invention, reference should be had to the following appended claims.

What is claimed is:
1. A heat set polyester article, comprising:
the article made by heating an amorphous sheet of polyethylene terephthalate to a temperature high enough to cause softening thereof;
heating a female mold to a temperature above the glass transition temperature to crystallize said PET sheet;
positioning said softened sheet over the cavity of said female mold;

drawing said softening sheet into said female mold cavity using a male plug, wherein said male plug has dimensions of between about 90% and 99.5% of the dimensions of said female mold;

transferring said softened sheet from said male plug to said female mold by the application of air pressure to said softened sheet;

heating said softened polyester sheet to above its glass transition temperature through contact with said female mold, which causes said polyester to be heat-set thereby;

releasing said air pressure and thus allowing said molded polyester to shrink back onto said male plug and be cooled thereby; and withdrawing said molded, cooled polyester from said plug.

2. A heat set polyester article according to claim 1, wherein said male plug is heated to a temperature below the glass transition temperature of oriented, heat-set polyethylene terephthalate, and wherein said amorphous sheet is heated to a temperature above its non-oriented glass transition temperature.

3. A heat set polyester article according to claim 2, wherein said male plug has dimensions equal to 98% of the dimensions of said female mold, and
wherein a gap is produced thereby.

4. A heat set polyester article according to claims 3, or 4, wherein said sheet is heated to between about 80° and 130° C., said female mold is heated to between about 135° C. and 190° C., wherein said male mold is heated to between 67° C. and 125° C., and wherein said air pressure applied to said male plug is between about 10 psi and 300 psi.

5. A heat set polyester article according to claim 4, wherein said sheet is heated to between about 90° C. and 100° C., wherein said female mold temperature is between about 140° C. to 160° C., and wherein said male plug temperature is between about 90° C. and 100° C.

6. A heat set polyester article according to claim 4, wherein said article is a container whose contents can be heated in a microwave, or a conventional oven.

7. A heat set polyester article according to claim 5, wherein said article is a container which can be heated in a microwave, or a conventional oven.

8. A heat set polyester article according to claim 4, wherein said article is a hot-fill container.

9. A heat set polyester article according to claim 5, wherein said article is a hot-fill container.

10. A process for heat setting polyethylene terephthalate, comprising the steps of:
heating an amorphous sheet of polyethylene terephthalate to a temperature above its glass transition temperature;
heating a female mold to above the glass transition temperature of said polyethylene terephthalate to effect crystallization;
positioning said sheet over said female mold cavity;
drawing said sheet into said cavity by means of a male plug maintained at a temperature below the oriented, crystallized glass transition temperature of said sheet, wherein said male plug has dimensions of between about 90 and 99.5% of the dimensions of said female mold;
transferring said stretched polyethylene terephthalate sheet from the surface of said male plug to the surface of said female mold across a gap therebetween; and
allowing said molded polyethylene terephthalate to shrink back onto said male plug and thereby be cooled to a temperature between its glass transition temperature.

11. A process, according to claim 10, wherein said polyethylene terephthalate sheet is transferred from said male plug to said female mold by means of air pressure applied therebetween said polyethylene terephthalate sheet and said male plug.

12. A process according to claim 11, wherein said polyester sheet is biaxially oriented as it is drawn into said female mold cavity.

13. A process according to claim 12, wherein said female mold is heated to between about 130° C. and 190° C., and said male plug is heated to between about 67° C. and 125° C., and wherein the amount of air pressure is between about 10 psi and 300 psi.

14. A process according to claim 13, wherein said polyester sheet is heated to between about 80° C. and 130° C.

15. A process according to claim 14, wherein said polyester sheet is heated to between about 90° C. and 100° C., said female mold is heated to between about 140° C. and 160° C., and said male plug is heated to about 90° C. and 100° C.

16. A process according to claim 15, wherein the degree of crystallinity of said molded PET is between about 25% and 35%.

17. A process according to claim 13, wherein said article is a microwave oven container or a conventional oven container.

18. A process according to claim 15, wherein said article is a microwave oven container or a conventional oven container.

19. A process according to claim 13, wherein said article is a hot-fill container.

20. A process according to claim 15, wherein said article is a hot-fill container.

* * * * *

UNITED STATES PATENT OFFICE
CERTIFICATE OF CORRECTION

PATENT NO. : 4388356

DATED : Jun. 14, 1983

INVENTOR(S) : John E. Hrivnak, Robert J. Gartland

It is certified that error appears in the above-identified patent and that said Letters Patent are hereby corrected as shown below:

Column 11, line 27, delete 3 and insert therefor --2--.

Column 11, line 28, delete 4 and insert therefor --3--.

Signed and Sealed this

Twenty-second Day of May 1984

[SEAL]

Attest:

GERALD J. MOSSINGHOFF

Attesting Officer

Commissioner of Patents and Trademarks